(12) United States Patent  (10) Patent No.: US 8,356,569 B2
Sjoblom  (45) Date of Patent: Jan. 22, 2013

(54) LOCATION SIGNALING DEVICE (76) Inventor: Hans Sjoblom, Ostersund (SE)

( * ) Notice: Subject to any disclaimer, the term of this patent is extended or adjusted under 35 U.S.C. 154(b) by 190 days.

(21) Appl. No.: 10/587,160

(22) PCT Filed: Jan. 26, 2005

(86) PCT No.: PCT/SE2005/000087
§ 371 (c)(1),
(2), (4) Date: Jun. 12, 2007

(87) PCT Pub. No.: WO2005/070758
PCT Pub. Date: Aug. 4, 2005

(65) Prior Publication Data
US 2007/0284476 A1   Dec. 13, 2007

(30) Foreign Application Priority Data

Jan. 26, 2004  (SE) ........................ 0400150

(51) Int. Cl.
*B64B 1/50*  (2006.01)
*B63C 9/20*  (2006.01)
(52) U.S. Cl. ...................... 116/210; 116/DIG. 9; 244/33
(58) Field of Classification Search .................. 116/210, 116/DIG. 8, DIG. 9; 244/33, 153 R; 40/214
See application file for complete search history.

(56) References Cited

U.S. PATENT DOCUMENTS

| 2,486,158 | A | * | 10/1949 | Haas | 244/33 |
|---|---|---|---|---|---|
| 3,086,737 | A | * | 4/1963 | Hyman | 244/153 R |
| 3,335,985 | A | | 8/1967 | Neal | |
| 3,381,655 | A | * | 5/1968 | Rozzelle | 116/210 |
| 3,657,752 | A | * | 4/1972 | Davidson et al. | 441/31 |
| 3,837,281 | A | * | 9/1974 | Shaffer et al. | 102/336 |
| 3,980,260 | A | * | 9/1976 | Laske | 244/153 R |
| 4,052,955 | A | * | 10/1977 | Haushalter | 116/210 |
| 4,533,099 | A | * | 8/1985 | Stewart | 244/153 R |
| 4,722,498 | A | * | 2/1988 | Cameron | 244/153 R |
| 4,768,739 | A | * | 9/1988 | Schnee | 244/146 |
| 4,815,677 | A | | 3/1989 | Rushing et al. | |
| 4,944,242 | A | * | 7/1990 | Russell | 116/210 |
| 5,762,293 | A | * | 6/1998 | Crosbie | 244/33 |
| 5,816,537 | A | * | 10/1998 | Pascoe et al. | 244/153 R |
| 2004/0163582 | A1 | * | 8/2004 | Willis et al. | 116/210 |
| 2006/0163433 | A1 | * | 7/2006 | Beckingham et al. | 244/153 R |
| 2007/0295864 | A1 | * | 12/2007 | Garvin | 244/153 R |

FOREIGN PATENT DOCUMENTS

| CA | 2172852 A | * | 9/1997 |
| DE | 1531448 | | 12/1969 |
| JP | 2007001458 A | * | 1/2007 |

* cited by examiner

*Primary Examiner* — R. A. Smith
(74) *Attorney, Agent, or Firm* — Larson & Larson, P.A.; Frank Liebenow; Justin P. Miller (57) ABSTRACT

A location signalling device comprising a wing balloon for signalling a location. The wing balloon is fixed to a tether line that itself is fixed to the location to be signalled. The wing balloon has an inflatable aerodynamically shaped hollow body to be at least partly be filled with a lighter-than-air gas and having a wing attack surface for air flowing relative to said wing balloon. The floating aloft of said wing balloon is supported by said air flow. When the wing balloon is inflated, a flexible wing portion is passively variable. The stronger the wind, the less attack is given. Thus, the dragging force on the tether line is generally static.

19 Claims, 7 Drawing Sheets

LOCATION SIGNALING DEVICE

FIELD OF THE INVENTION

This invention pertains in general to the field of location signalling devices, and more particularly to signalling devices for locating e.g. equipment or persons in emergency and/or in need of being located and picked-up or rescued. Even more particularly, the invention relates to a signalling device rising above the location of a person in emergency or the location of equipment, thus facilitating rescue or pick-pick operations. The location signalling device is intended for use by e.g. persons in an emergency situation, for instance persons lost overboard of vessels, persons stranded with emergency landed aeroplanes, or persons injured or lost in the wilderness, or equipment having e.g. finished a task and signalling its location for being picked-up.

BACKGROUND OF THE INVENTION

One of the most difficult tasks of search and rescue (SAR) operations are marine rescue operations at night times and heavy weather. Locating a person swimming in the open ocean from larger distances is nearly impossible. Even when a rescue team, independently if situated on a vessel or in an air-bound rescue vehicle, is very close to the swimmer, the swimmer itself is hard to discover. This is caused by obstacles such as e.g. the ocean waves, rain, fog, and darkness. Ocean waves have mostly heights exceeding the height of the swimmer over the water surface by multiple times. Land-based rescue operations, such as alpine rescue operations are another example of such difficult tasks.

Therefore, various types of signalling devices for signalling the position of persons in an emergency or for locating equipment have been proposed in the past.

Figure 1A:
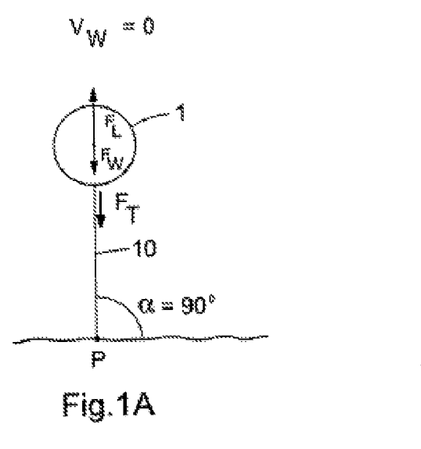
FIGS. 1A to 1F are schematic illustrations of a pure kite, a pure balloon and a wing balloon in different windy weather conditions.
Figure 1B:
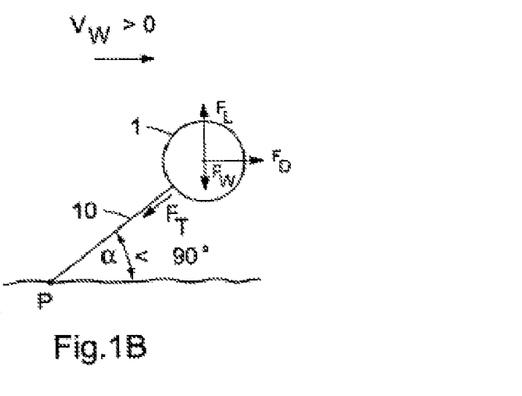
Figure 1C:
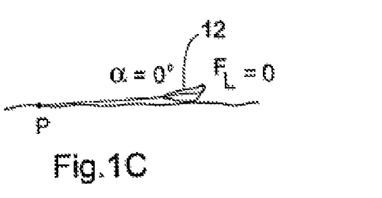
Figure 1D:
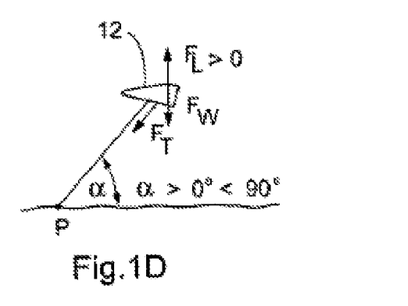

For instance a warning and signalling system including a kite attached to a flexible rope is disclosed in U.S. Pat. No. 4,768,739. The kite is used as an enhanced visibility warning and signalling device. The kite is carried aloft by blowing wind. However, a kite 12 always needs at least a certain amount of relative air movement, such as wind, in order to keep the kite at a certain height. This is illustrated in FIGS. 1C and 1D. To keep the signalling device at a minimum height is essential for the efficiency of detecting persons in emergency. In situations of very calm weather or windless weather conditions, a kite will drop to the surface and not fulfill the signalling purpose. Moreover, a kite is sensitive to turbulence and gets easily unstable, which leads to the kite crashing down on the surface. This is a basic disadvantage of kites, limiting the range of use unnecessarily. Furthermore, for injured or handicapped persons it is not possible to launch a kite.

Therefore location and signalling balloon devices have been proposed, e.g. in U.S. Pat. No. 4,944,242. A balloon body is in case of an emergency situation filled with a lighter-than-air gas from e.g. a pressurised container or a chemical reaction. The inflated balloon is fixed to a tether line, which is e.g. attached to the person in emergency or to the ground near that person, in order to signal the position of that person to search and rescue (SAR) operations. However, balloons have a number of disadvantages when being used as signalling devices. Balloons are not suitable for use in windy weather conditions in contrast to the above mentioned kites. With increasing wind velocity a balloon 1, fixed to a surface below by means of a tether line, will be drawn down to the surface due to the resulting force $F_T$ on the balloon being dominated by the dragging force $F_D$ of the wind on the balloon. This is illustrated in FIGS. 1A and 1B. The inclination angle α decreases from no wind ($v_w=0$) with increasing wind $v_w>0$. One possibility to solve this problem is to increase the size of the balloon being filled with gas. However, this option is very limited for the use in emergency signalling kits. This is due to the fact that these kits should be as compact and lightweight as possible when not in use. This condition limits both the size of such a balloon and the amount of available gas for inflating the balloon.

Figure 1E:
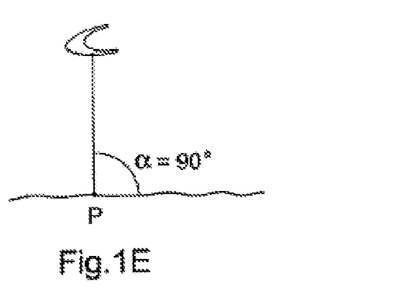
Figure 1F:
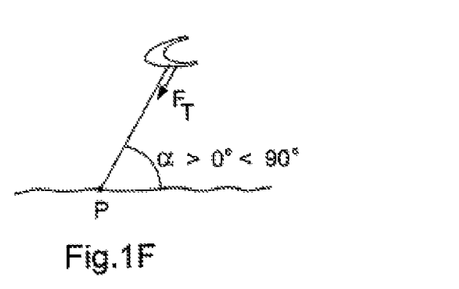

In order to overcome the drawbacks of signalling devices being based on purely a kite or a balloon, it has been proposed to aerodynamically shape balloons in the form of a kite, e.g. in the patent application CA-A-2172852, or in the form of a wing, e.g. in U.S. Pat. No. 4,815,677. U.S. Pat. No. 3,657,752 discloses a locator device for locating submerged equipment having returned to the surface of an ocean. The device generates gas by a chemical reaction of a compound with water, whereupon the gas inflates a balloon-kite flying aloft tethered to a container at sea level. The balloon-kite is radar-detectable and ascends into the air above the water by means of the buoyancy of the gas-filled part of the balloon-kite and/or the aerodynamic lift of the kite part of the balloon-kite. This is illustrated in FIGS. 1E and 1F. However, also these devices combining a kite or a wing with a balloon have certain undesired drawbacks. For example it is desired that a dragging force that is exerted by the signalling device on the tether line is generally constant at the point where it is fixed to a person in emergency, a piece of equipment, or a ground surface. The dragging force should be constant within a certain limit. This ensures on the one-hand that the above-mentioned dragging force of the signalling device does not exceed a maximum load of the tether line, thus preventing its rupture. A rupture of the tether line which would render the signalling device useless as the kite or the balloon flowing away will no longer signal the desired location. In addition, a dragging force that comes close to or exceeds the weight of the equipment or person, whose position is to be signalled, will result in an undesired effect of moving the person or equipment. This may be a health hazard for e.g. a person drawn through the water, causing the person to unintentionally get water into the respiratory system. Moreover, in case of e.g. a child or non-heavy equipment, the signalling balloon may draw the child or the equipment over the ground, when used on land, resulting in injuries of the child or in damage of the equipment. In the worst case, the person or equipment will be raised out of the water or over ground. If the dragging force on the other hand becomes too low, the signalling device will not ascend sufficiently high and cannot fulfill its signalling purpose.

A kite-balloon or a wing-balloon has the advantage that it remains aloft properly under windless or low wind conditions due to the lifting force of the lighter-than-air gas in the balloon. Moreover, at high wind conditions, the aerodynamic shape of the kite or the wing compensates for the downward force imposed on the signalling device. At high wind conditions, even these devices, not withstanding the problem of tether-line-rupture, will become unstable due to turbulent behaviour of the kite or wing as mentioned above.

Thus, there is a need for a new signalling device based on a combination of a wing or kite with a balloon, avoiding the above-identified problems and ensuring a generally constant dragging force on the tether line.

SUMMARY OF THE INVENTION

The present invention overcomes the above-identified deficiencies in the art and solves at least the above-identified problems by providing a location-signalling device, and a method according to the appended patent claims.

The general solution according to the invention is to provide a wing balloon with a flexible wing portion. With increasing wind, the flexible wing portion bends, and the effective surface of the wing is decreased. Thus, the lifting force generated by means of the wing is reduced and the effect of increasing wind is compensated for. However, the signalling wing balloon works also in no-wind weather conditions by means of the balloon being filled with a lighter-than-air gas lifting the balloon. Bending of the wing is performed purely passively and no active means or devices are necessary in the wing balloon to achieve the variable attack surface. Thus, a very compact package design of the location-signalling device is achieved.

More particularly, the present invention has the advantage over the prior art that it provides an emergency signalling device being more efficient than the known prior art devices. The signalling device according to the invention is usable over a wider range of weather conditions than previously known devices. Furthermore, the device according to the invention provides a generally constant dragging force on the tether-line, increasing safety of the device as well as comfort for the users of the device. Hence, the present invention has the advantage over the prior art that it is usable over a wide range of wind conditions without unduly increasing the load on a tether line of a location-signalling device.

Preferably, the wing balloon is easily visually detectable, thanks to the fact that the wing balloon having a distinct colour differing from the background. This colour is e.g. a highly visible fluorescent orange. Optionally, several such colours are arranged on the surface of the balloon, for instance in stripes or other shapes, in order to generate an as high as possible visually detectable contrast.

In addition to that, the wing is formed such that a "waving" movement pattern of the balloon is achieved. For instance, the balloon flies on an elliptical path, or on a path in the form of a "8". Thus, the visual detectability of the wing balloon is further enhanced.

Optionally, the wing balloon is equipped with a smoke generating means. This means release smoke from the wing balloon, thus increasing the distance of visibility.

Preferably, the wing balloon is fabricated from a material that reflects light upon illumination.

Furthermore, the wing balloon is preferably made of a radar reflective material or comprises radar reflective material or means, e.g. inside the balloon as radar reflective swatches, or as radar reflective stripes or tails of e.g. aluminium attached to the rear of the wing balloon. This enables the wing balloon to be detected by radar, which allows directional signal finding of the wing balloon providing its exact position or direction in relation to a search vehicle. Radar detection is given independently of the present weather conditions.

According to another preferred embodiment, the wing balloon is equipped with a chemical heating means. This provides detectability of the wing balloon in 3D by means of thermocameras.

The wing balloon according to the invention increases drastically the success rate of localisation and rescue missions and improves the survival chances of persons in emergency.

BRIEF DESCRIPTION OF THE DRAWINGS

Further objects, features, and advantages of the invention will become apparent from the following description of exemplary embodiments of the present invention, reference being made to the accompanying drawings, in which.

DESCRIPTION OF EMBODIMENTS

Figure 2:
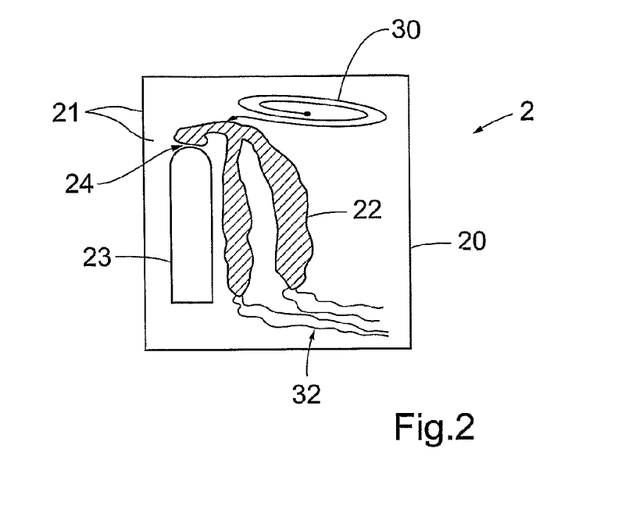
FIG. 2 is a schematic illustration of a location-signalling device according to an exemplary embodiment of the invention in the non-inflated condition.

In an exemplary embodiment of the invention according to FIG. 2, a location-signalling device 2 is shown in the non-inflated condition. The device comprises a housing 20 and has approximately the size of a packet of cigarettes, although other designs, shapes, and sizes are possible, depending on the intended use as well as adherent conditions. The device comprises a fastening means 21, e.g. for fastening to an object such as a life saving jacket, a backpack, or other objects. The packet 2 contains an inflatable wing balloon 22. The wing balloon 22 is self-inflating upon activation, wherein the gas originates from a gas storage device 23, such as a gas cylinder containing compressed gas. The size of the gas cylinder is adapted to the size of the inflatable volume of the wing balloon. For instance, the gas cylinder has to have a size of $\frac{1}{200}$ of the wing balloon inner volume at a compression pressure of 200 bar of the gas inside the gas cylinder. The gas for inflating the wing balloon is a lighter-than air gas, preferably non-inflammable or health hazardous when inhaled, such as Helium. The inflation process is performed in a non-explosive way, such that neither the balloon or persons close to the device may be harmed or damaged. This improves as well acceptance of the device by its users, in contrast to e.g. airbag systems that inflate explosively. Preferably, a flow-limiting valve 24 controls the inflation process, so that the inflation process takes a couple of seconds.

Figure 3:
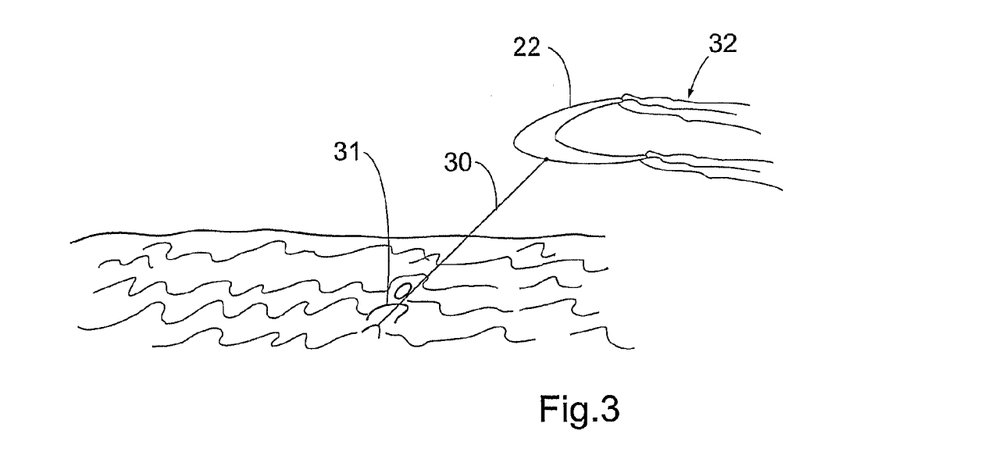
FIG. 3 is a schematic illustration showing the location signalling device of FIG. 2 with the wing balloon inflated and aloft.

FIG. 3 shows the location signalling device of FIG. 2 with the wing balloon aloft thanks to the buoyancy of the wing balloon filled with the above-described gas. The buoyancy principle is based on the fact that a body (=wing balloon) immersed in a fluid (=air) experiences a net upward force equal in magnitude to the weight of the fluid displaced by the body. Here the lighter-than-air gas displaces the heavier air.

The wing balloon is fixed to a tether line 30 keeping the wing balloon at a fixed distance relative a fixed position 31. However, the height above the level of the fixed position 31 depends on prevailing wind conditions and the resulting inclination angle α. This height insures the detectability of the wing balloon and should not fall below a certain limit. Therefore, the tether line has a sufficient length, e.g. ca. 10-40 m for marine rescue operations and ca. 50-100 m for land based rescue operations, such as alpine rescue operations. Marine rescue or pick-up operations are often performed by using a helicopter. In this case, it is important that the line length is not too long, so that the wing balloon cannot get caught in the rotating helicopter blades. A suitable length for the tether line is about 10 m in this case. Then the helicopter is, after locating the location signalled by means of the wing balloon, able to hover over the location at a sufficiently low height without risking incidents with rotor blades catching the tether line. Then the person or equipment in the water may be safely picked up by means of a lifting gear placed in the helicopter.

During land-based operations, the length of the tether line may be chosen longer, increasing the detection range of the wing balloon. This is due to the fact that e.g. a helicopter may land near the person or equipment to be picked-up, thus avoiding the helicopter blade related problems.

In all cases, the length of the tether line is to be chosen, such that the detection range of the wing balloon is as far-reaching as possible without causing other problems. The radar detection range of the location signalling device according to the invention is approximately 40-50 km with the above-mentioned line lengths. The wing balloon is preferably made of a signal reflecting material, wherein the range of signals reflected comprises light both visible and invisible as well as radar or radio waves. Preferably, the wing balloon is easily visually detectable at all weather conditions, thanks to the fact that the wing balloon having a distinct light reflecting colour differing from the background. This colour is e.g. a highly visible fluorescent colour like orange or yellow, or any other luminescent colour including the range of phosphorescent colours. Optionally, several such colours are arranged on the surface of the balloon, for instance in stripes or other shapes, in order to generate an as high as possible visually detectable contrast.

Furthermore, the wing balloon is preferably made of a radar reflective material or comprises radar reflective material or means, e.g. inside the balloon as radar reflective swatches, or as radar reflective stripes or tails 32 of e.g. aluminium attached to the rear of the wing balloon. This enables the wing balloon to be detected by radar, which allows directional signal finding of the wing balloon providing its exact position or direction in relation to a search vehicle. Radar detection is given independently of the present weather conditions.

Figure 11:
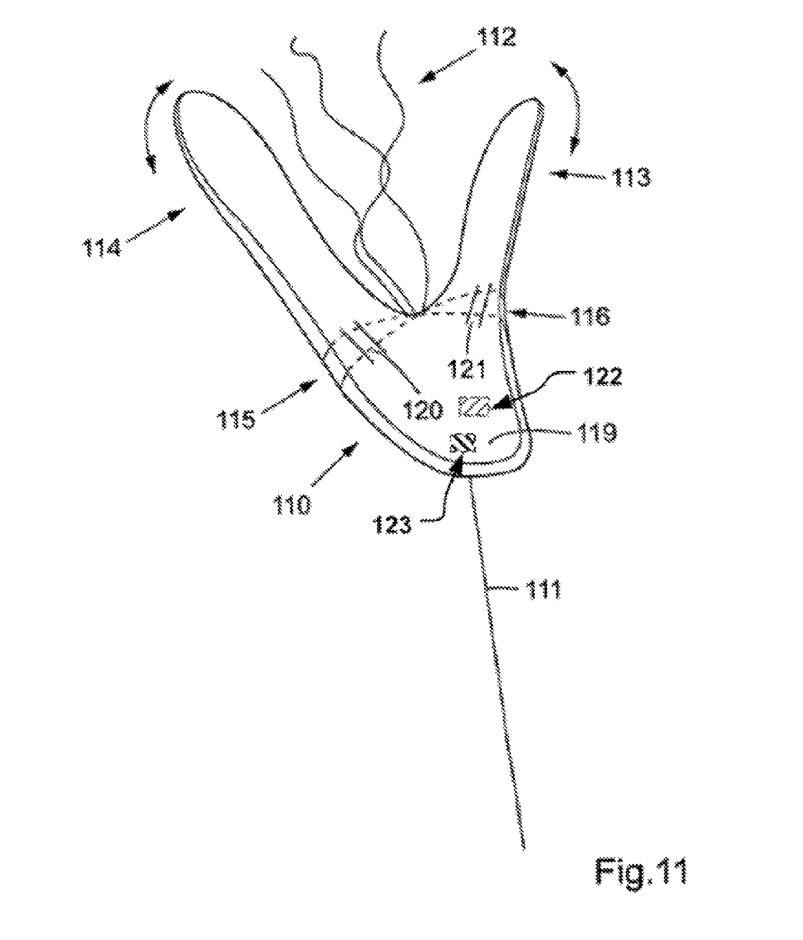
FIG. 11 is a schematic illustration of an exemplary inflated wing balloon.

According to another preferred embodiment, the wing balloon is equipped with a chemical heating means 122 (FIG. 11). This provides detectability of the wing balloon in 3D by means of thermocameras.

Hence, the wing balloon is designed to have maximum passive detectability by means of visually and radar detectability.

Furthermore, the material of the wing balloon is preferably water-repellent so that the weight of the wing balloon does not increase by the weight of water soaked up in the material.

An Airfoil is generally a structure designed to create a reaction upon its surface from relative air movement relative to the structure. The wing balloon is shaped as an airfoil having a variable reaction upon its surface depending on the relative airflow velocity. More precisely, the wing has an effective 'attack' surface, which decreases with increasing airflow velocity. In this way, an increasing lifting force is compensated for. The lifting force of the tethered wing balloon is the upward force resulting from the sum of aerodynamic lifting forces, dragging forces and buoyancy of the wing balloon. In contrast, the lifting force of an aeroplane is purely the upward force created by a difference in air pressure on both sides of an airfoil. Thus, by varying the 'attack' surface of the wing balloon, the amount of lift is changed arbitrarily and the lift generated is variable in a specific way favourable for keeping the dragging force on the tether line generally constant. Static and dynamic upward rising force are balanced against each other to ensure this effect. This is explained by the principle of physics that the wing balloon strives to an equilibrium in which the sum of all the forces on the wing balloon equals zero.

Air moving over and under the wing balloon, as the air is flowing past the wing balloon due to wind, creates this difference in air pressure. This is because the air that moves over the top of the wing has farther to go because the wing is tilted slightly upward. The shape of the wing balloon is important for lift. A preferred shape is that the wing balloon has a curved, upper surface and a flatter, lower surface. The air has further to go around on the top of the wing balloon, whereas the bottom of the wing balloon is generally flat, so air does not have as far to go. Due to the shape of the wing balloon, the air on the bottom can move faster to a certain point than the air on top. Difference of movement of air around the wing balloon creates this lift, and lift pushes the wing balloon against the downward force as explained above. However, at conditions with no relative air movement, the buoyancy is the only lifting force. Hence, the resulting lifting force is balanced between the two lifting forces, namely buoyancy and aerodynamic lifting force. This combines the advantages of both principles and ensures that the wing balloon is aloft over a wide range of wind conditions.

The wing balloon is designed that it becomes more and more arrow-shaped achieving the above-described dependency of the active wing surface on relative airflow velocity. Due to inherent flexibility, the wing balloon will revert to its original shape with decreasing relative airflow velocity. Thus it is achieved, that the wing balloon generates a generally static dragging force on the tether line in the range of 0-40 m/sec airflow velocity.

In order to stabilise the wing balloon in the roll direction, the wing balloon is preferably equipped with stabilising means such as tails attached to the back of the wing balloon. These tails serve primarily the aerodynamic purpose of stabilising the wing balloon. Furthermore, these tails may be made of a radar-reflective material, such as aluminium strips or tinfoil strips, so that they even fulfill the purpose of radar/detectability.

It has to be pointed out that the wing balloon does not comprise any active control devices such as electronics, power sources such as batteries, or active mechanical elements, such as wing surface varying means known from e.g. supersonic aeroplanes.

The wing balloon is fixed to a tether line, e.g. a strong nylon thread or string, having an appropriate length, in the range between 20 m and 100 m, e.g. 30 m. The tether line itself is attached or fixed to a fixpoint, such as an individual person, equipment, or a location. The lifting force of the wing balloon is preferably designed such that at wind speeds of 33 m/sec the wing balloon does not turn down more than 45 degrees from the vertical plane seen from the fixpoint.

In addition to the above-mentioned, the wing is preferably formed such that a "waving" movement pattern of the balloon is achieved at wind speeds above a certain lowest limit. For instance, the balloon flies on an elliptical path, or on a path in the form of a "8". Thus, the visual detectability of the wing balloon is further enhanced. A waving movement is easier to detect from a large distance.

Optionally, the wing balloon is equipped with a smoke generating means 123 (FIG. 11). This means release smoke from the wing balloon, thus increasing the distance of visibility.

Preferably, the wing balloon is fabricated from a material that reflects light upon illumination.

Figure 4A:
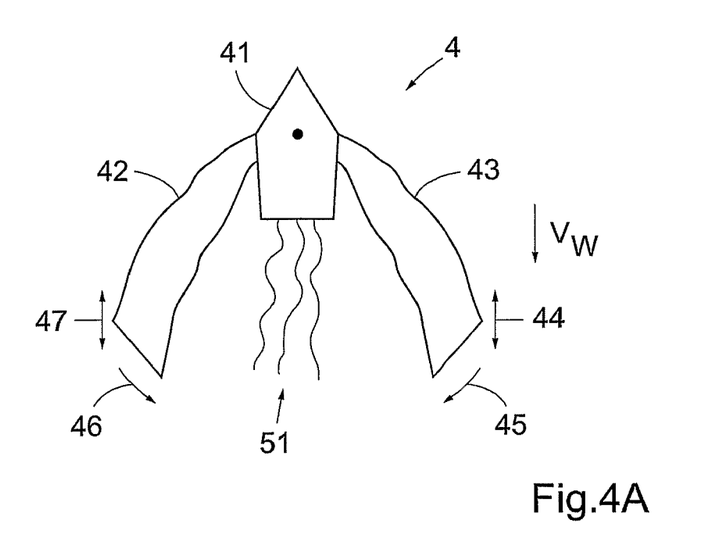
FIGS. 4A to 4C are schematic illustrations showing the wing balloon according to different embodiments of the invention.
Figure 4B:
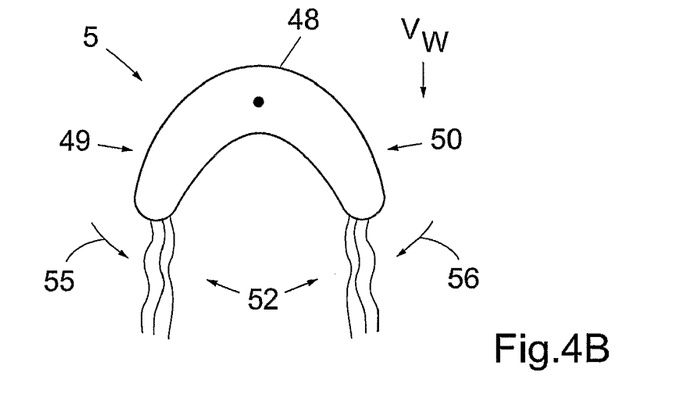
Figure 4C:
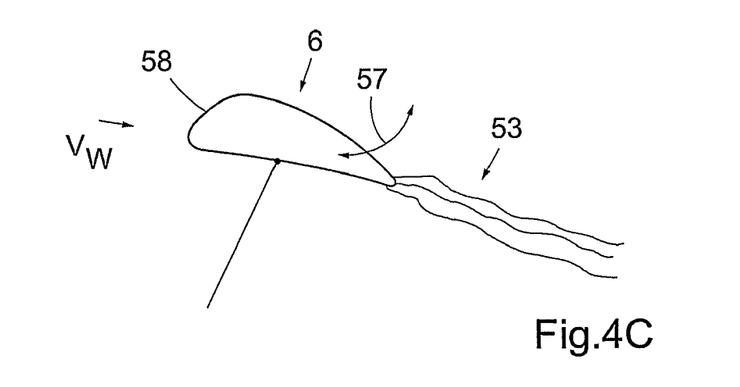
Figure 5:
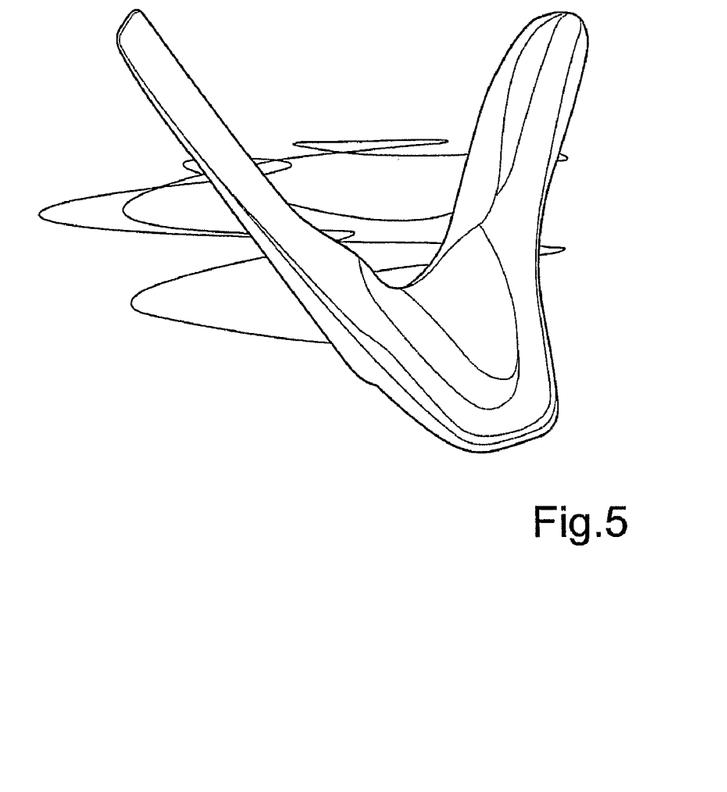
FIG. 5 to 10 are photographic illustrations showing the wing balloon according to different embodiments of the invention.
Figure 6:
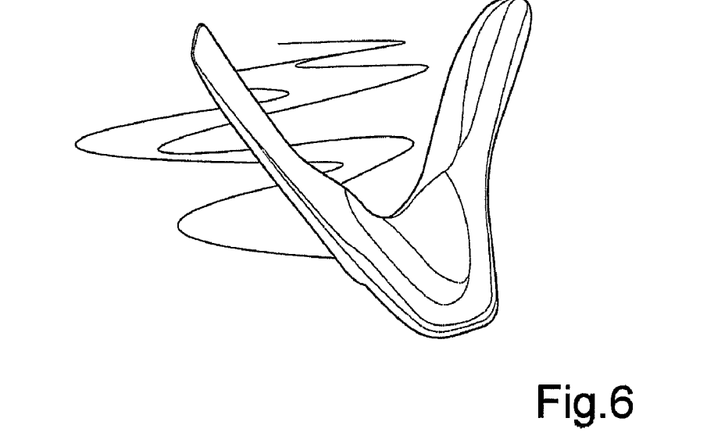
Figure 7:
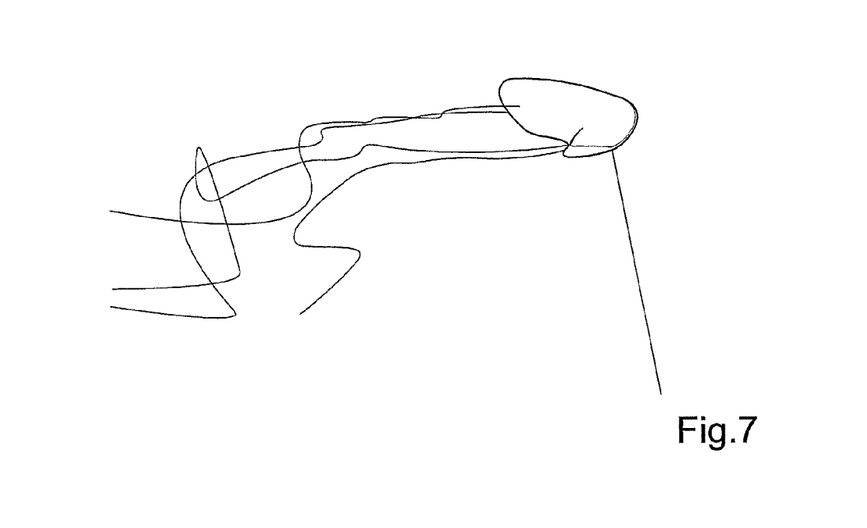
Figure 8:
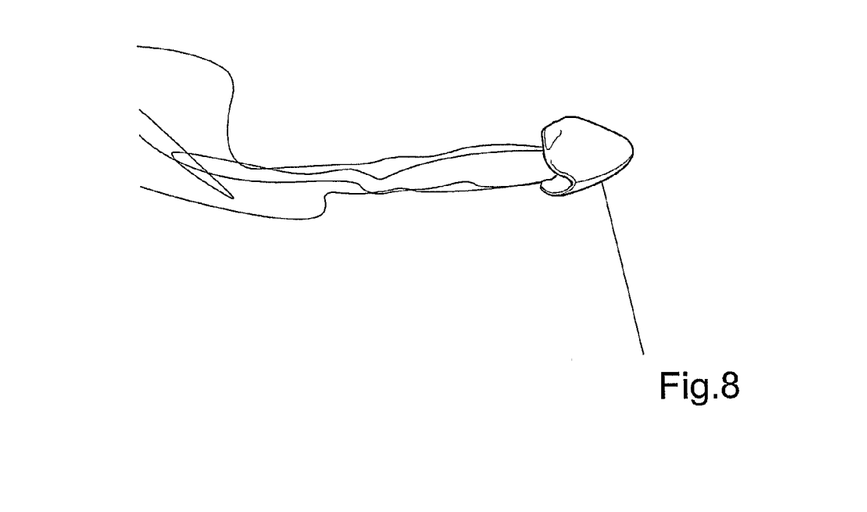
Figure 9:
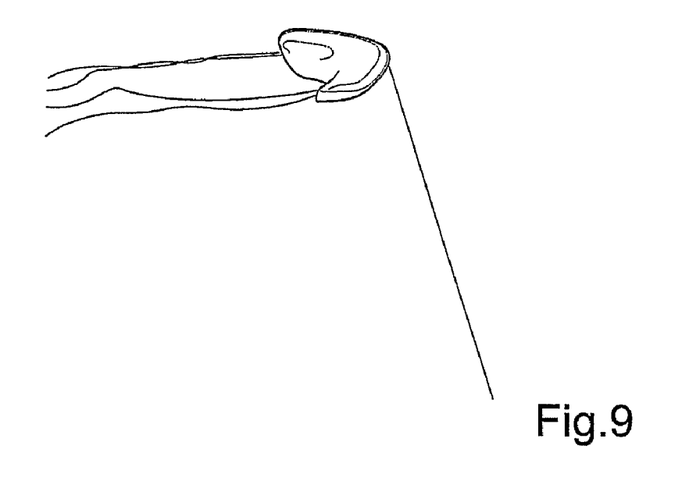
Figure 10:
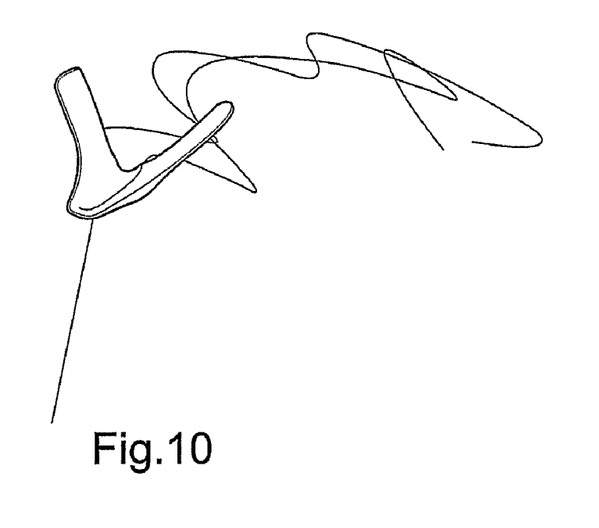

FIG. 4A to 4C are schematic illustrations showing the wing balloon according to different embodiments of the invention.

FIG. 4A shows a wing balloon 4 having a central inflatable body 41, side wings 42, 43 and tails 51. With increasing relative air movement $v_w$, the side wings 42, 43 move in the direction of arrows 47, 44 and 45, 46 respectively, i.e. in this case an upward inward movement decreasing the attack area of wing balloon 4 in relation to the relative air movement $v_w$. FIG. 4B shows a wing balloon 5 having an arrow shaped inflatable body 48, side wings 49, 50 and tails 52 on each of the side wing's ends. With increasing relative air movement $v_w$, the side wings 49, 50 move in the direction of arrows 55, 56, i.e. in this case an inward movement decreasing the attack area of wing balloon 5 in relation to the relative air movement $v_w$. FIG. 4C shows a wing balloon 6 in a side cross-sectional view. The wing balloon 6 has an inflatable body 58 and tails 53. With varying relative air movement $v_w$, the rear portion of wing 6 moves in the direction of arrow 57 respectively, i.e. in this case an inward movement decreasing the attack area of wing balloon 4 in relation to increasing relative air movement $v_w$ and vice versa.

FIG. 5 to 10 are photographic illustrations showing the a variety of different exemplary wing balloons according to different embodiments of the invention, at least partly corresponding to FIGS. 4A to 4C.

FIG. 11 is a schematic illustration of an exemplary inflated wing balloon 110 having a tail 112, being tied to a tether line 111. Flexible wing portions 113, 114 comprise adjacent inflated 113, 114 and non-inflated chambers 115, 116, wherein said inflated chambers 113, 114 and 119 respectively being connected to each other through conduits 120, 121 in said non-inflated chambers 115, 116. Thus, the flexibility is achieved resulting in the resilient behaviour of wings 113, 114 achieving the variable attack surface of wing balloon 110.

A further way of achieving the resilient flexibility of a wing balloon is to vary the thickness of the wing balloon material appropriately. A thinner wall results in an easier to bend section of a wing and vice versa.

When during e.g. SAR operations a person in emergency has been location thanks to the location signalling device of the invention, often the wing balloon is released by cutting off the tether line. This is most often performed by the rescue person being dropped from e.g. a vessel or a helicopter, then swimming to the person and taking care of the further pick-up proceeding. At this point the wing-balloon is released and flies away. In this condition the wing balloon may be a risk for air traffic, damaging airborne vehicles. In this case the wing balloon is optionally equipped with a pressure release means, releasing the lighter-than-air gas from the inflated wing balloon. The pressure release valve is passively activated by an increasing pressure in relation to the surrounding pressure. The surrounding pressure decreases with increasing height, approx. 1 mbar per 3 m. Alternatively this relative pressure difference caused by the balloon rising, may cause the balloon to explode. For instance, at a height of 450 m, the pressure difference is 15 mbar. This pressure difference as a release pressure is sufficient to ensure reliability of the location signalling device avoiding deflating by mistake. After deflating or exploding, the residual elements are no longer a potential danger for air-traffic. From an environmental point of view the wing balloon may in this case be made from a bio-degradable material.

Applications and use of the above-described location-signalling device according to the invention are various and include exemplary fields such as SAR operations of e.g. seamen, mountaineers, or skiers in need of being rescued. Potential users of the device are persons, which may get into life-threatening emergency situations at more or less remote locations, at which the persons life depends on being detected and rescued by third persons. Such persons are e.g. the above-mentioned, but also the rescuers themselves, i.e. SAR operators, pilots of aeroplanes and helicopters, rescue or life-saving service operators such as sea rescue or coastguard service operators. Another application is to have the emergency kit integrated in life vests available on passenger boats and other vessels, readily available in case of emergency, when a life-vest is put on by persons as a routine safeguard or during emergency cases.

Another application is the location of equipment. One example of many possible is to equip an oil sample-taking device that is dropped from airborne vehicles into the sea where oil contamination has been detected. The device takes oil samples from the surface for a later analysis in order to identify the cause or source of the contamination. Then the device has to be re/collected, whereby it is already a difficult task to locate the device due to the waves of the sea. Another problem is to collect the device. Both problems may be solved by means of the localisation signalling device according to the present invention. A signalling wing balloon connected to the sampling device by means of a tether line helps locating the sampling device. Furthermore, the tether line may be constructed from such strong material, that it is possible to collect the device by drawing it up from the sea with the tether line. This application is based on finding equipment that e.g. has fulfilled a certain purpose and there is an interest for re-collecting the equipment due to e.g. economical or environmental purposes. Another example in addition to the above-mentioned is e.g. a test torpedo shot from a submarine. The test torpedo is easily located by means of the location signalling device according to the invention, when it has stopped and shall be picked-up for re-use.

A further application is to signal the location of equipment which has broken down, has crashed or which has been damaged on its travel. Therefore the position is unknown and most often the object is lost. By means of the location signalling device according to the invention, the position is easily detectable.

Yet another application is to mark a certain location. For instance, the location signalling device according to the invention may be dropped from a fixed wing or rotary wings aircraft that has located a certain object or person. The location signalling device is then dropped at the position and inflates the wing balloon, thus signalling this location. The object or person may then be easily located and picked up from e.g. a vessel or a motor vehicle, or a fixed wing or rotary wings aircraft depending on the nature of the location. The present invention has been described above with reference to specific embodiments. However, other embodiments than the preferred above are equally possible within the scope of the appended claims, e.g. different wing shapes than those described above, etc.

Furthermore, the term "comprises/comprising" when used in this specification does not exclude other elements or steps, the terms "a" and "an" do not exclude a plurality and a single processor or other units may fulfill the functions of several of the units or circuits recited in the claims.

The invention claimed is:

1. A location signaling device comprising a wing balloon for signaling a location and a tether line fixed at a distal end of the tether line to said wing balloon and, in use, fixed at a proximal end of the tether line to said location;

wherein said wing balloon comprises an inflatable aerodynamically shaped hollow body configured to be at least partly filled with a lighter-than-air gas and a wing attack surface configured for generating a lifting force in air flowing relative to said wing balloon and wherein, when said body is inflated:
said wing balloon comprises a flexible wing portion, whereby said attack surface of said wing balloon is passively reduced by an increase in air flowing relative to said wing balloon,
said flexible wing portion is arranged such that increasing relative air-flow passively decreases a lift generating surface of said wing balloon.

2. The location signaling device according to claim 1, wherein said wing balloon aerodynamic shape is a generally arrow-shaped.

3. The location signaling device according to claim 1, wherein said flexible wing portion is made of a resilient material.

4. The location signaling device according to claim 1, said tether line having a length of 30 m.

5. The location signaling device according to claim 1, said wing balloon comprising at least one radar reflecting surface.

6. The location signaling device according to claim 5, wherein said radar reflecting surface is a radar reflective tail attached to said wing balloon.

7. The location signaling device according to claim 1, said wing balloon having a highly visible color.

8. The location signaling device according to claim 1, said wing balloon having a smoke generating means.

9. The location signaling device according to claim 1, said wing balloon having a chemical heat generating means.

10. The location signaling device according to claim 1, wherein said wing balloon is made of a water repellent material.

11. The location signaling device according to claim 1, wherein said wing is formed for converting relative airflow to a reciprocating, waving, elliptical, or figure 8 motion of said wing balloon.

12. The location signaling device according to claim 1, wherein said device is a location signaling device for search and rescue of people in an emergency.

13. The location signaling device according to claim 1, wherein said device is a location signaling device for locating equipment.

14. The location signaling device according top claim 1, wherein said flexible wing portion is configured to move in an inward direction with increasing relative air-flow to passively decrease the lift generating surface of said wing balloon.

15. A location signaling device comprising a wing balloon for signalling a location and a tether line fixed at a distal end of the tether line to said wing balloon and, in use, fixed at a proximal end of the tether line to said location;
wherein said wing balloon comprises an inflatable aerodynamically shaped hollow body configured to be at least partly filled with a lighter-than-air gas and a wing attack surface configured for generating a lifting force in air flowing relative to said wing balloon and
wherein, when said body is inflated:
said wing balloon comprises a flexible wing portion, whereby said attack surface of said wing balloon is passively reduced by an increase in air flowing relative to said wing balloon, and
said flexible wing portion is arranged such that increasing relative air-flow passively decreases a lift generating surface of said wing balloon,
wherein said flexible wing portion comprises adjacent inflated and non-inflated chambers, said inflated chambers being connected to each other through conduits in said non-inflated chambers.

16. A method of generally keeping static the dragging force on a tether line connected to a location signaling device comprising a wing balloon for signaling a location, said wing balloon comprising an inflatable aerodynamically shaped hollow body configured to be at least partly be filled with a lighter-than-air gas and having a wing attack surface for air flowing relative to said wing balloon such that floating aloft of said wing balloon is supported by said air flow, wherein said method comprises:
passively varying the wing attack surface of said wing balloon by said airflow, such that increasing air-flow passively decreases a lift generating surface of said wing balloon.

17. The method of claim 16, and further comprising inflating the wing balloon with a lighter-than-air gas and thereby forming a flexible wing portion.

18. The method of claim 17, wherein the flexible wing portion bends in response to increasing wind, and thereby decreases the lift generating surface of the wing balloon.

19. The method of claim 18, wherein the lift generating surface of the wing balloon is decreased as a result of an inward movement of the flexible wing portion in response to increasing air velocity with respect to the wing balloon.

* * * * *